UNITED STATES PATENT OFFICE.

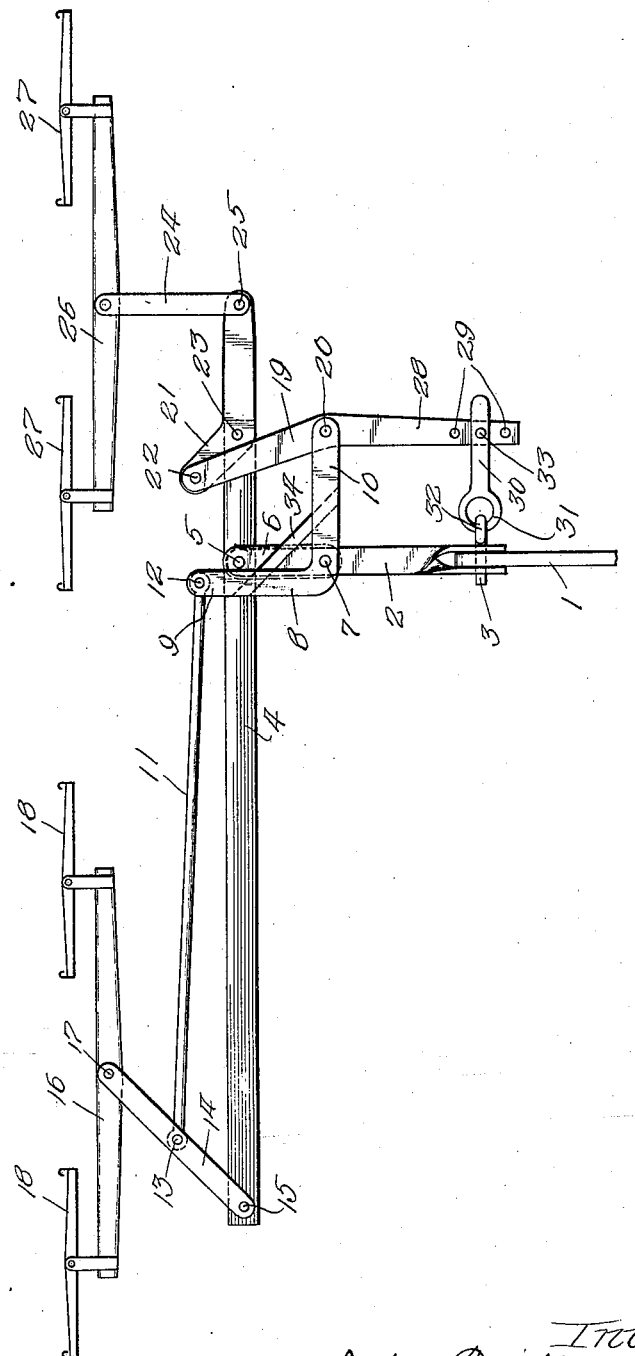

JOHN FREITAG, OF NIOTA, ILLINOIS.

DRAFT-EQUALIZER.

1,370,203.  Specification of Letters Patent.  Patented Mar. 1, 1921.

Application filed June 12, 1919. Serial No. 303,677.

*To all whom it may concern:*

Be it known that I, JOHN FREITAG, a citizen of the United States, residing at Niota, in the county of Hancock and State of Illinois, have invented certain new and useful Improvements in Draft-Equalizers, of which the following is a specification.

My invention relates to draft equalizers, and has for one of its objects the provision of a simple and efficient draft equalizer.

A further object is the provision of a strong, durable and light equalizer particularly for use with various agricultural implements.

Other objects will appear hereinafter.

An embodiment of my invention is indicated in the accompanying drawing in which the figure is a top plan view of a draft equalizer embodying my invention.

In the drawing I have indicated a fragment of a plow beam 1 to show the application of my draft equalizer or horse evener to an agricultural implement. The device is provided with a draft bar 2 connected to the plow beam 1 by a pin 3. Any desirable connection may be provided between the draft bar 3 and the tool to which the device is to be attached.

At the front end of the draft bar 2 is an equalizer bar or lever 4 having a pivot pin 5 therein. Also pivoted on the pin 5 is a link 6 which extends rearwardly of the lever 4 and is provided with a pivot pin 7 at its rear end. Pivoted on the pivot pin 7 at its angular portion is an angular lever 8, one end 9 of which extends across the lever 4, and the other end 10 of which is disposed substantially parallel with the lever 4. The end 9 of the lever 8 is connected to a link 11 as at 12, and the other end of the link 11 is connected as at 13 to a link 14, and the latter connected at one end with the lever 4 as at 15. The front end of the link 14 is connected to a doubletree 16 as at 17. The doubletree 16 is provided with two swingletrees 18.

The end 10 of the lever 8 is connected to a link 19 as at 20, and the front end of the link 19 connected to the angular part of a lever 21 as at 22. The lever 21 is pivoted to one end of the lever 4 as at 23. The other end of the lever 21 is connected with a link 24 as at 25, and at the front end of link 24 is a doubletree 26 having swingletrees 27 attached thereto.

The link 19 preferably extends backwardly providing an arm 28 which has a plurality of holes 29 therein. A member 30 is provided with a ring 31 which engages a corresponding ring 32 on the pin 3. The rings 31 and 32 are preferably provided sufficiently large to prevent the member 30 from tending to move the pin 3 longitudinally. One end of the member 30 is connected with one of the holes 29 by a pin 33 and may be connected with any of the other of the holes 29, when so desired.

In practice I preferably make the parts 2, 6, 8, 14, 19, 21 and 24 each in two parts, with one part disposed immediately underneath the other, as indicated in the drawing. It will be apparent, however, that in the connection shown with the plow beam 1 the ends of member 2 are turned up so that the ends of these bars show. The member 8 is also preferably provided with a rider 34, one on each of the parts of lever 8 and disposed substantially as shown so as to prevent the end 9 of the lever 8 from catching on the link 6 or draft bar 2.

While I have illustrated and described the preferred form of my invention, I do not desire to be limited to the precise details set forth but desire to avail myself of such variations and changes as come within the scope of the appended claims.

I claim:—

1. A draft equalizer comprising an equalizer bar; an angular lever pivoted at one side of the bar with one portion extending across and another portion substantially parallel with said equalizer bar; a link pivoted to one end of the equalizer bar; a doubletree connected to said link; a link connecting an intermediate part of the first-mentioned link with the part of the angular lever extending across the equalizer bar; a link connected with the part of the angular lever parallel with the equalizer bar; a lever pivoted to the equalizer bar and connected with the last-mentioned link; and a doubletree connected with the last-mentioned lever.

2. A draft equalizer comprising an equalizer bar; a pivot pin in the equalizer bar; a link pivoted to the pivot pin and extending rearwardly of the equalizer bar; an angular lever pivoted to the rear ends of said link with one portion extending across and the other portion disposed substantially parallel with the equalizer bar; two double trees; a connection between each doubletree and one end of the equalizer bar; and means connecting the ends of said angular lever with said connections.

In testimony whereof I have signed my name to this specification on this 3d day of June, A. D. 1919.

JOHN FREITAG.